ounited States Patent Office 2,837,778
Patented June 10, 1958

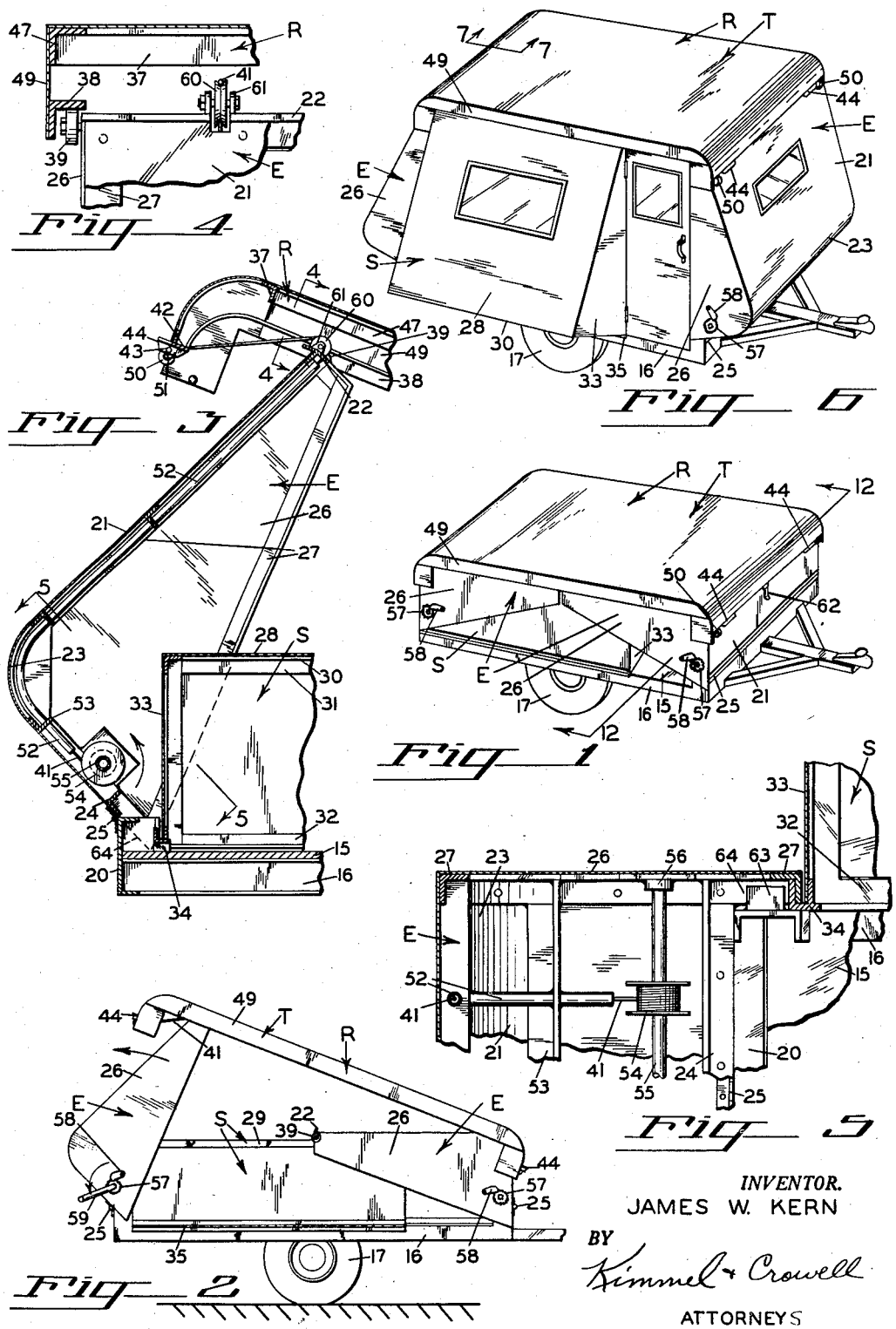

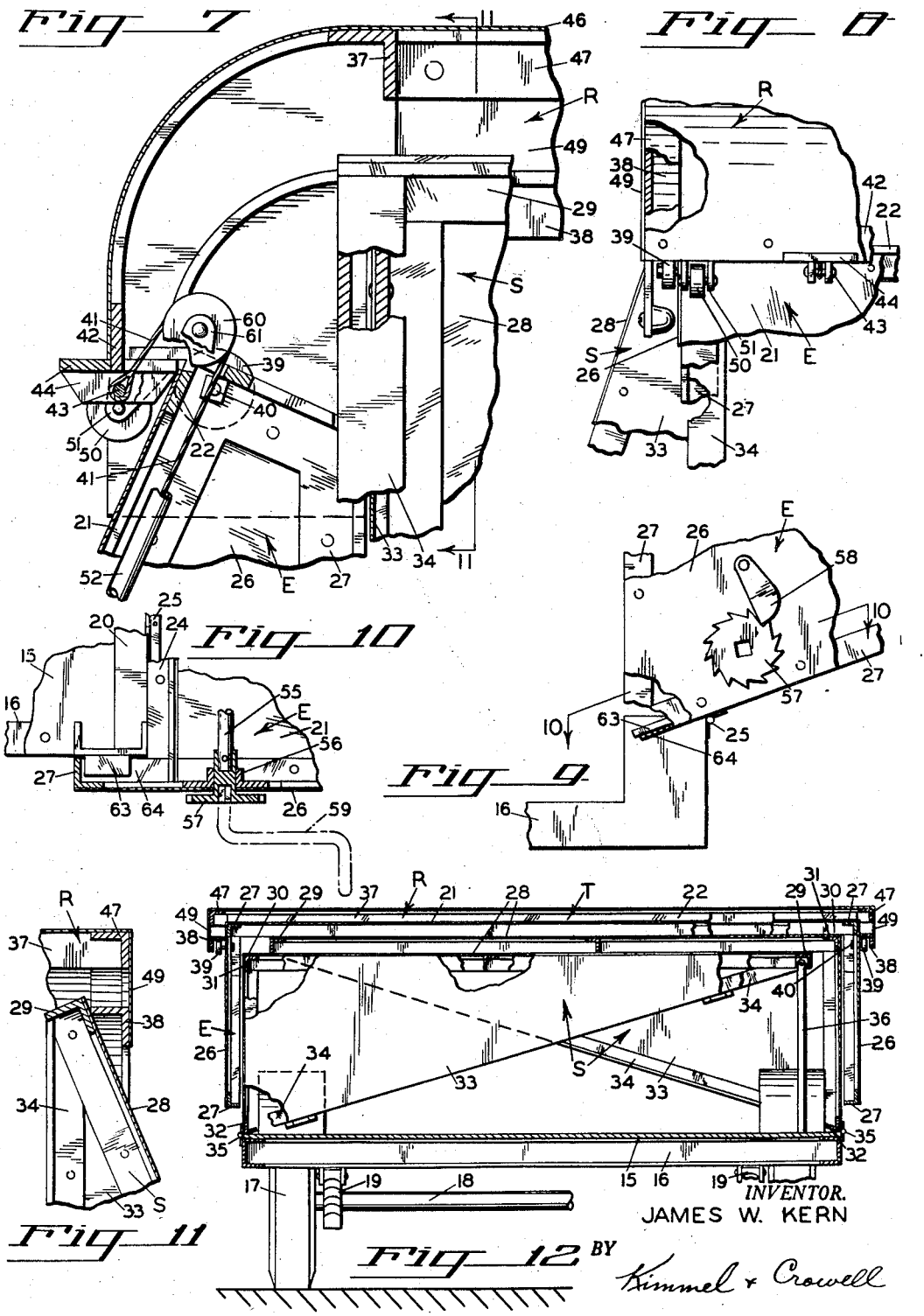

2,837,778

FOLDING TRAILERS

James W. Kern, Vancouver, Wash.

Application November 19, 1956, Serial No. 622,941

3 Claims. (Cl. 20—2)

The present invention relates to folding trailers, and more particularly to such devices which are adapted to be used on vacation trips and the like.

The primary object of the invention is to provide a folding trailer that can be folded into a compact unit to facilitate it being towed from place to place, wherein the height of the trailer is at a minimum, providing clear visibility and better maneuverability at all times.

A further object of the invention is to provide a folding trailer that can be easily erected to full living quarters with a minimum of effort by one person.

A still further object of the invention is to provide a folding trailer manufactured of a relatively rigid sheet material forming a durable trailer having a pleasing appearance.

A still further object of the invention is to provide a folding trailer requiring a minimum of space for storage.

Other objects and advantages will become apparent in the following specification when considered in the light of the attached drawings, in which:

Figure 1 is a perspective view of the invention shown in folded position.

Figure 2 is a side elevation of the trailer in the process of being erected to living quarters.

Figure 3 is a fragmentary enlarged longitudinal sectional view of the trailer in the same position as illustrated in Figure 2.

Figure 4 is a fragmentary enlarged sectional view, taken on the line 4—4 of Figure 3, looking in the direction of the arrows.

Figure 5 is a fragmentary enlarged sectional view, taken on the line 5—5 of Figure 3, looking in the direction of the arrows.

Figure 6 is a perspective view of the invention shown fully erected for living quarters.

Figure 7 is an enlarged fragmentary longitudinal sectional view taken on the line 7—7 of Figure 6, looking in the direction of the arrows.

Figure 8 is a fragmentary end elevation partially broken away for convenience of illustration.

Figure 9 is an enlarged fragmentary side elevation of the raising and lowering gear.

Figure 10 is a fragmentary sectional view, taken on the line 10—10 of Figure 9, looking in the direction of the arrows.

Figure 11 is a fragmentary enlarged sectional view taken on the line 11—11 of Figure 7, looking in the direction of the arrows.

Figure 12 is an enlarged transverse sectional view, taken on the line 12—12 of Figure 1, looking in the direction of the arrows.

Referring now to the drawings in detail wherein like reference characters indicate like parts throughout the several figures, the reference character T indicates generally my new and improved folding trailer which includes a rectangular bottom 15, mounted upon a framework 16. Wheels 17 journalled on an axle 18 support springs 19 carrying the framework 16. Relatively high cross end channel frame members 20 extend above the bottom 15 at both ends of the trailer T.

The trailer T is provided with ends E consisting of a sheet of body material 21 extending from a transverse T bar 22 to the curved portion 23, terminating in a transverse angle bar 24. The ends E are hingedly connected to the upper edge of the channels 20, by piano-type hinges 25. Triangular side walls 26 are formed on the end units E and are reinforced by the diagonal bars 27.

Side wall units S consist of body sheet material 28 which extends from the upper angle bars 29 down to lower corner 30 where they extend at right angles from corner frame 31 to an acute angle bar 32. The side units S, referring particularly to Figure 12, have end walls 33 extending from the acute angle bar 32 to the upper angle 29. The end walls 33 are reinforced by diagonal angle bars 34. The acute angle bars 32 are pivotally connected along the bottom of the trailer by piano-type hinges 35. When the side wall units S are hinged inwardly, as viewed in Figure 12, one of the side wall units S is supported by legs 36, while the other side wall unit S rests thereupon.

A roof R is supported upon the top of the vertical end units E by cross frame members 37 of the top supported by side angles 38 which rest on rollers 39. The rollers 39 are anchored to the T bar 22 at 40 on either side of the end units E. The rollers 39 also perform another purpose, which will be described later on.

When the trailer is erected, the roof R is supported as illustrated particularly in Figures 7 and 8. A cable 41 is fixedly secured to cross T bar 42 at 43 within brackets 44. The cross frame 42 forms the lower transverse roof supporting bars for the roof R. Transverse angle bars 37 further support the sheeting 46 of the roof R, also angle bars 47 extend longitudinally of the roof R.

The side angles 38 form longitudinal tracks secured to the downwardly extending side walls 49 of the roof R and are adapted to travel over the rollers 39 journalled on the end wall units E during the raising and lowering of the roof R. Rollers 50 are journalled to the transverse T bars 42 by brackets 51. The rollers 50 support the roof R upon the end walls E in the process of raising and lowering the end walls E and roof R, which will later be described.

The cables 41 pass through guideways 52 which are fixedly secured to the end walls E and lead to the transverse frame members 53. The cables 41 are trained about cable drums 54, which are keyed to a transverse shaft 55, which in turn is journalled to the sides 26 of the ends E by suitable bearings 56.

Keyed to one of the ends of the shafts 55 are ratchet wheels 57. The wheels 57 are held from turning in one direction by a pawl 58 and are rotated in the other direction by a crank 59. The cables 41 pass over idler rollers 60, which are journalled to the cross T member 22 by brackets 61; the object of which will be apparent in the operation of the unfolding and folding of the trailer T, which will now be described.

The roof R is held in down position, as illustrated in Figure 1, by latches 62. There may be a lock (not shown) associated therewith. In the erecting of the trailer T from the position shown in Figure 1 to that in Figure 2, the following action takes place. The operator unlatches the latches 62, he inserts the crank 59 within one of the ratchet wheels 57 and revolves the ratchet wheel 57 in the direction indicated in Figure 2, turning the shaft 55 and the reels 54. This action winds the cables 41 so as to raise the transverse member 42 of the roof R above the heel or curved portion 23 of the end piece E. At this moment the cable 41 will tend to raise the T bar 22 forming the upper ends of the end walls E upwardly, as indicated in Figures 2 and 3. When the T bar 22 reaches the position shown in Figure 7, a portion thereof will engage over the transverse T member 42 of the roof R, the cables 41 holding the T member 42 tightly thereagainst locked by the pawls 58 holding the ratchet wheel 57 from backward rotation when the crank 59 is removed.

The crank 59 is then inserted in the oppositely disposed transverse shaft 55 and operated again, raising the roof R above the oppositely disposed end unit E and again raising the end unit upwardly and outwardly, completing the raising of the end units E and the roof R. Both ends E and roof R, could be raised simultaneously if desired, but it would require two operators unless both transverse shafts 55 were keyed together by suitable means.

In the raising operation, the rollers 50 ride on the end plates 21 of the ends E, assisting in the stabilizing of the roof R and the end units E. Rollers 39 are journalled to the upper ends of the T bars 22 of the end units E and are adapted to operate under the side angles 38 forming part of the sides of the roof R, which allows the end walls E to travel under the roof R easily.

Referring particularly to Figure 9, fixedly mounted stops 63 form part of the end channels 20 at the bottom of the trailer T. When the ends E are in their full raised position, the lower ends 64 of the side angle frames 27 thereof engage the stops 63, thus maintaining the end units E in a fixed vertical position.

After the roof R and the end units E are raised, as above described, the side units S can be hinged upwardly and outwardly about their hinges 35, first one and then the other, their upper top rails 39 coming against the angle bars 38, as best illustrated in Figure 11.

The position of furniture or equipment within the trailer T has not been dealt with, as it would have nothing to do with the structure of the trailer T itself.

Having thus described the preferred embodiment of the invention, it should be understood that numerous structural modifications and adaptations may be resorted to without departing from the scope of the appended claims.

What is claimed is:

1. A folding trailer comprising a horizontal base frame, front and rear end walls hingedly secured to opposite ends of said base frame, opposite side walls hingedly secured to opposite sides of said base frame, a roof, a pair of tracks extending longitudinally on the underside of said roof and having arcuately depending end portions on the opposite ends thereof, rollers positioned on the free end portions of said front and rear end walls for engagement with said tracks, pulleys positioned on the free end portions of said front and rear end walls adjacent said rollers, winches secured to said front and rear end walls adjacent the lower portions thereof, cables extending from said winches engaging over said pulleys and secured to the opposite ends of said roof whereby said roof can be lifted above said end wall suspended on said cable.

2. A device as claimed in claim 1 wherein means are provided on said roof for detachably securing said roof to said side walls when in folded position.

3. A device as claimed in claim 1 wherein said roof is provided with anti-friction rollers for engagement with said side walls to assist in raising said roof and said side walls from folded position.

References Cited in the file of this patent

UNITED STATES PATENTS

| | | |
|---|---|---|
| 2,015,176 | Ebenhack | Sept. 24, 1935 |
| 2,076,486 | Watt | Apr. 6, 1937 |
| 2,493,258 | Massare | Jan. 3, 1950 |